US008381882B1

(12) United States Patent
Hoogenakker

(10) Patent No.: US 8,381,882 B1
(45) Date of Patent: Feb. 26, 2013

(54) SPRING LOADED ANTI-LOCK BRAKING SYSTEM SENSOR

(75) Inventor: Alan Hoogenakker, Urbandale, IA (US)

(73) Assignee: Tuson RV Brakes, LLC, Vernon Hills, IL (US)

( * ) Notice: Subject to any disclaimer, the term of this patent is extended or adjusted under 35 U.S.C. 154(b) by 48 days.

(21) Appl. No.: 13/134,017

(22) Filed: May 26, 2011

(51) Int. Cl.
*F16D 66/00* (2006.01)

(52) U.S. Cl. ............... 188/1.11 E; 303/138; 324/207.25

(58) Field of Classification Search .............. 188/1.11 E; 303/138; 76/115.08, 866.5; 73/115.08, 866.5; 310/168; 324/207.25, 173
See application file for complete search history.

(56) References Cited

U.S. PATENT DOCUMENTS

| | | | | |
|---|---|---|---|---|
| 3,626,227 | A * | 12/1971 | Ritsema | 310/168 |
| 3,769,534 | A * | 10/1973 | Wroblewski et al. | 310/168 |
| 3,772,548 | A * | 11/1973 | Wroblewski et al. | 310/168 |
| 3,890,517 | A * | 6/1975 | Marsh et al. | 310/168 |
| 4,017,756 | A * | 4/1977 | Davidson | 310/168 |
| 4,090,099 | A * | 5/1978 | Daffron | 310/168 |
| 5,018,384 | A * | 5/1991 | Hayashi et al. | 73/115.08 |
| 6,523,425 | B1 * | 2/2003 | Kubik | 73/866.5 |
| 2003/0050749 | A1 * | 3/2003 | Cervantez et al. | 701/49 |
| 2011/0133046 | A1 * | 6/2011 | Lemerise et al. | 248/230.8 |
| 2011/0185801 | A1 * | 8/2011 | Johannsen et al. | 73/115.08 |

* cited by examiner

*Primary Examiner* — Bradley King
(74) *Attorney, Agent, or Firm* — G. Brian Pingel; Camille L. Urban; David M. Breiner

(57) ABSTRACT

An anti-lock braking system includes a sensor apparatus that includes a sensor body. In a first position, the sensor body is positioned such that a desired gap is maintained between the sensor body and a reference point located on a tone ring, which is rotatably coupled to a corresponding wheel hub. In the first position, a spring-loaded plunger holds the sensor body in place. When the sensor body is moved to a second position, a plunger pin is displaced within the plunger, putting tension on an internal spring. The tension in the spring returns the sensor body to the first position.

11 Claims, 4 Drawing Sheets

SPRING LOADED ANTI-LOCK BRAKING SYSTEM SENSOR

BACKGROUND

Antilock braking systems are commonly employed in trailers and other towable vehicles to control tire slip. The antilock braking systems use wheel speed monitors to monitor relative deceleration rates of wheels while braking and respond to indications of slip by temporarily reducing the hydraulic pressure to the brakes. Typically, wheel speed monitors used in antilock braking systems have two primary components: a sensor and a tone ring.

The tone ring is a structure such as a ring or disk that has a number of reference points (e.g., notched teeth) on it. The tone ring rotates with the wheel and the reference points are sensed by the sensor to generate data about the speed of the corresponding wheel. Sensors typically are fixedly attached to the brake flange such that a desired gap is maintained between the sensor and the tone ring. In most implementations, the wheel speed monitor only functions properly when the particular gap is maintained. However, any number of events can cause some object to exert force on the sensor, pushing it out of position. Typically, a mechanic must then reposition the sensor to achieve the necessary gap.

SUMMARY

This summary is provided to introduce a selection of concepts in a simplified form that are further described below in the Detailed Description. This summary is not intended to identify key features or essential features of the claimed subject matter, nor is it intended to be used, in isolation, as an aid in determining the scope of the claimed subject matter. At a high level, embodiments of the invention relate to a spring-loaded antilock braking system (ABS) sensor apparatus. By using embodiments of the spring-loaded ABS sensor apparatus described herein, if the sensor is hit and knocked out of position, the "spring-loaded" feature allows the sensor to move with the item that is making contact with the sensor and then move the sensor back into its functional position without requiring manual adjustment.

A first illustrative embodiment of the present invention relates to an antilock braking system corresponding to a wheel. The illustrative braking system includes a braking assembly, which includes a brake flange mounted to an axle. A wheel hub is rotatably coupled to an outside end of the axle and has a tone ring attached thereto. A sensor is moveably coupled to the brake flange and senses the reference point to generate data about a speed associated with the corresponding wheel.

A second illustrative embodiment of the present invention relates to an antilock braking system sensor apparatus. According to the illustrative embodiment, the apparatus includes a sensor assembly having a sensor body that extends outwardly from a sensor head. A mounting bracket is attached to a brake flange and includes a bolt housing through which the sensor body extends. The illustrative embodiment further includes a plunger that is fixedly attached to the mounting bracket. In embodiments, the plunger includes a spring-biased plunger pin that engages the sensor head to hold the sensor in a first position and is configured to cause the sensor to return to the first position in reaction to the sensor being moved into a second position.

A third illustrative embodiment of the present invention relates to an antilock braking system. The illustrative braking system includes a braking assembly having a brake flange mounted to an axle. A wheel hub is rotatably coupled to an outside end of the axle and a tone ring having a reference point disposed thereon is coupled to the wheel hub such that the tone ring rotates with the wheel hub. According to embodiments, a sensor is moveably coupled to the brake flange using a mounting bracket and a plunger is fixedly attached to the mounting bracket. The plunger includes a spring-biased plunger pin that engages the sensor head to hold the sensor in a first position, and is configured to cause the sensor to return to the first position in reaction to the sensor being moved into a second position.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein.

DETAILED DESCRIPTION

The subject matter of embodiments of the invention disclosed herein is described with specificity to meet statutory requirements. However, the description itself is not intended to limit the scope of this patent. Rather, the inventor has contemplated that the claimed subject matter might also be embodied in other ways, to include different features or combinations of features similar to the ones described in this document, in conjunction with other technologies. Additionally, as the terms are used herein, an "outside" end or surface refers to an end or surface that faces toward the outside (toward the wheel end of the axle) of a vehicle in which embodiments of the invention are implemented, and an "inside" end or surface refers to an end or surface that faces toward the inside (away from the wheel end of the axle) of the vehicle.

Figure 1:
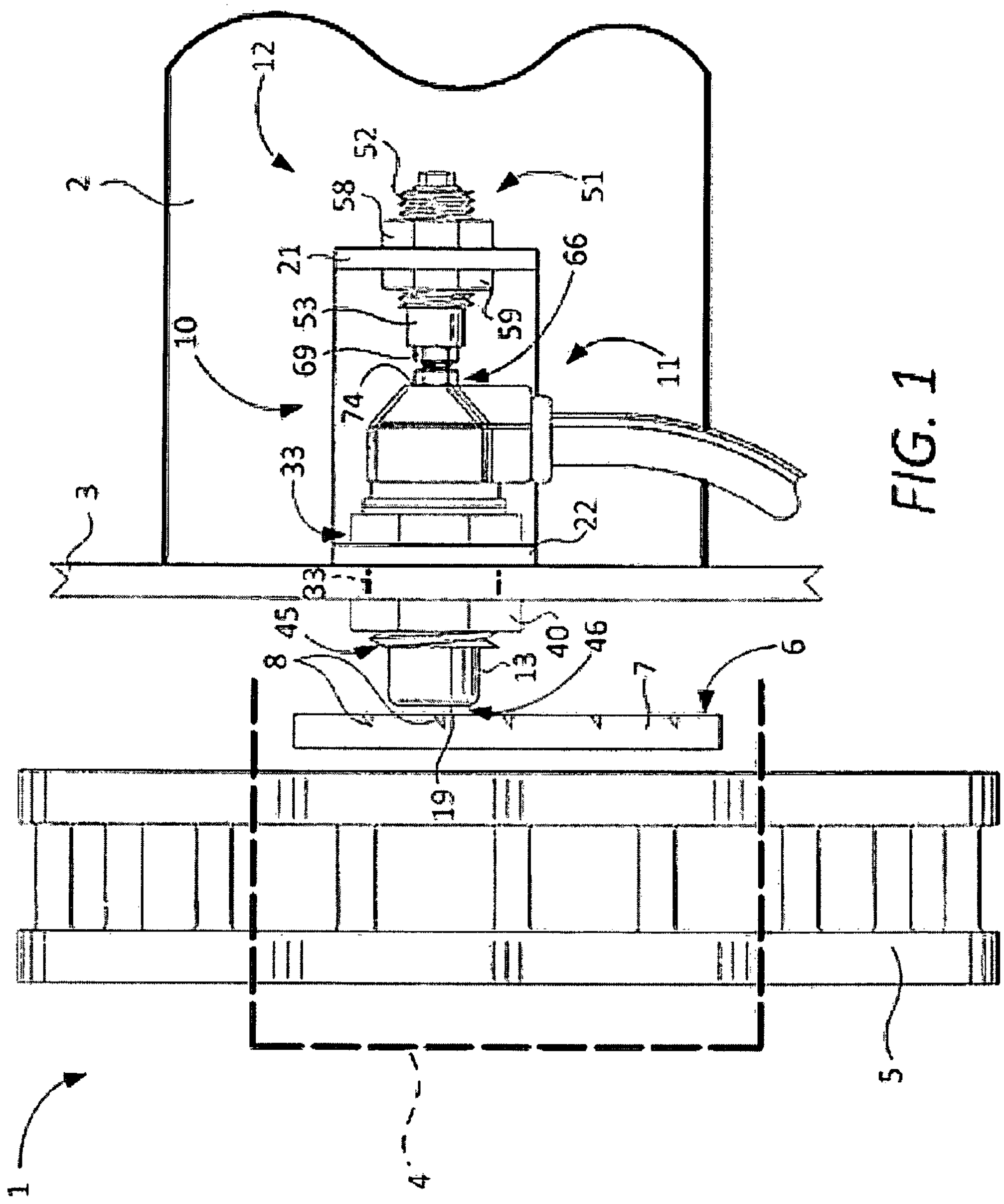
FIG. 1 depicts an illustrative ABS braking system in accordance with embodiments of the invention.

Referring to the drawings, and particularly to FIG. 1, there is depicted an illustrative ABS braking assembly 1. The braking assembly 1 includes an axle 2 and a brake flange 3 attached to the axle 2. According to various embodiments, the brake flange 3 can be attached to the axle 2 in any suitable manner such as, for example, by welding, bolting, and the like. In other embodiments, the brake flange can be integral to the axle 2. As illustrated in FIG. 1, a wheel hub 4 is rotatably coupled to the end of the axle 2. The wheel hub 4 provides attachment for a wheel (not illustrated herein for the purposes of brevity and clarity). Additionally, as depicted in FIG. 1, a rotor 5 and tone ring 6, which includes a body 7 and a number of reference points 8, are attached to the wheel hub 4.

According to various implementations of the invention, the braking assembly 1 can include any number of other features such as, for example, a set of calipers, hoses, bearings, and the like. The illustration in FIG. 1 and its corresponding description herein is not intended to limit the components or their configuration to the presented examples and is included only for the purpose of describing embodiments of the invention and providing context for that description.

Figure 2:
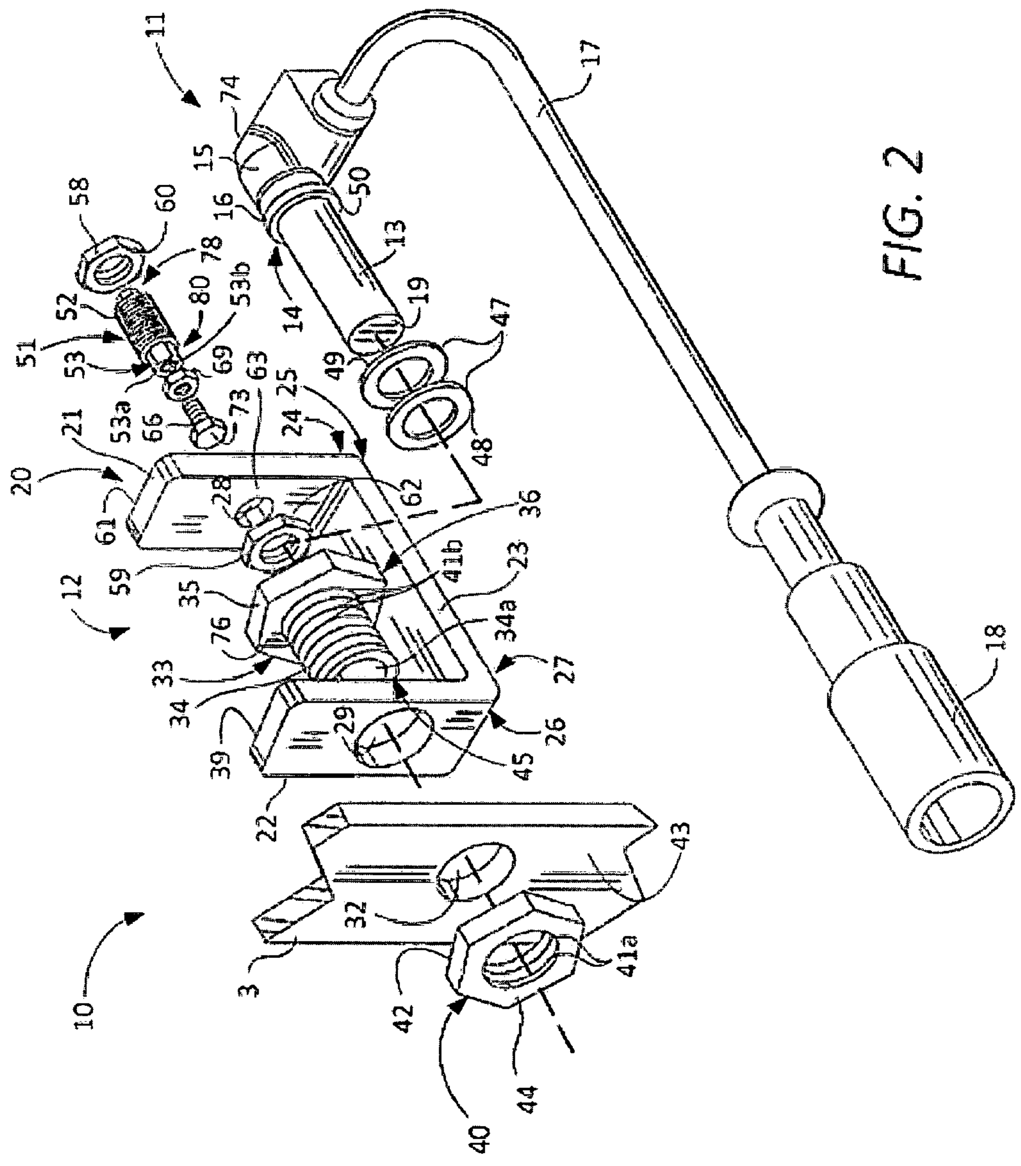
FIG. 2 is an exploded perspective view of an illustrative sensor apparatus for use in an ABS braking system in accordance with embodiments of the invention.

As illustrated in FIG. 1, the ABS braking assembly 1 also includes an exemplary sensor apparatus 10 in accordance with various embodiments of the invention. Turning now to FIG. 2, and with continued reference to FIG. 1, an illustrative sensor apparatus 10 is depicted in accordance with embodiments of the invention. The sensor apparatus 10 includes a sensor assembly 11 that is held in place using a mounting assembly 12. Implementations of ABS systems in accordance with embodiments of the invention use an antilock braking controller (not shown for the purposes of brevity and clarity) to measure incipient wheel slip. The brake pressure is modulated based on information about wheel speed, which is determined using a sensor assembly that includes a sensor that senses reference points on a tone ring. The tone ring is coupled to the wheel hub so that it rotates with the wheel.

The sensor assembly 11 can be any type of suitable sensor assembly such as, for example, those known in the art. As illustrated, the sensor assembly 11 includes a sensor body 13 that is coupled, at a base end 14 (shown only in FIG. 2) to a sensor head 15. A collar 16 is disposed around the sensor body 13, near the junction of the sensor body 13 and the sensor head 15. In various embodiments, an insulated wire 17 extends from the sensor head 15 and includes, at its other end, a communication connection 18 (see FIG. 2), which can be plugged into a communication channel (not shown) that includes, for example, an antilock braking controller.

According to some embodiments of the invention, the sensor body 13 is preferably cylindrical in shape and includes sensing technologies disposed therein. In other embodiments, the sensor body 13 can be configured according to other shapes. For instance, the sensor body 13 could be configured such that its cross-section is square, rectangular, triangular, octagonal, or the like. According to embodiments of the invention, the sensor assembly 11 can utilize any number of various sensing techniques known in the art such as, for example, magnetic reluctance, Hall effect, optics, and the like.

As illustrated, the sensor body 13 includes an outside surface 19 that is oriented in proximity to the tone ring 6 such that sensor technologies within the sensor body 13 can sense the reference points 8 on the tone ring 6. In embodiments, for example, the sensor body 13 can include a wire coil/magnet assembly, which generates pulses of electricity as the reference points 8 of the tone ring 6 pass in front of it. In other embodiments, the sensor body 13 can include a laser, other optical technologies, other types of sensing technologies, and the like. The antilock braking controller uses the electric pulses to determine wheel speeds and rates of acceleration/deceleration.

As indicated above, the tone ring 6 includes the body 7 and the number of reference points 8. The tone ring body 7 can be a disc, ring, or any other suitable structure upon which one or more reference points 8 can be disposed. According to various embodiments, the reference points 8 can be anything that can be observed by a sensor. In some embodiments, for example, the tone ring 6 is a ring with notched teeth that serve as the reference points 8. In other embodiments, the tone ring 6 can include raised teeth that serve as the reference points 8. One commonly used tone ring 6 has 100 evenly spaced teeth, but the number of teeth can vary depending on the implementation design. In embodiments, the tone ring 6 can be a separate entity from the wheel hub 4 and, in other embodiments, the tone ring 6 can be integral to the wheel hub 4. In still further embodiments, the tone ring 6 and the rotor 5 can be the same structure.

With more particular reference to FIG. 2, the mounting assembly 12 includes a mounting bracket 20. In embodiments of the invention, the mounting bracket 20 is a solid, U-shaped bracket and includes a first arm member 21, a second arm member 22 that is substantially parallel to the first arm member 21, and a connecting member 23. That is, the first arm member 21 is coupled, at a first end 24, to a first end 25 of the connecting member 23 and extends substantially perpendicularly away from the connecting member 23 in a first direction. The second arm member 22 is connected, at a first end 26, to the second end 27 of the connecting member 23 and extends substantially perpendicularly away from the connecting member 23, also in the first direction. In embodiments, as illustrated, a first opening 28 is disposed in first arm member 21, and a second opening 29 is disposed in the second arm member 22. In embodiments, the mounting bracket 20 can be made from any suitable material such as, for example, steel.

As shown in FIG. 1, the mounting bracket 20 can be oriented such that an outside surface 30 of the second arm member 22 is disposed against an inside surface 31 of the brake flange 3 such that the second opening 29 is aligned with an opening 32 in the brake flange 3. As illustrated, the mounting assembly 12 includes a bolt housing 33. In embodiments, the bolt housing 33 includes a hollow threaded body 34 having an opening 34*a* therethrough. In embodiments, a housing flange 35 is attached to a first end 36 of the bolt housing 33. In embodiments, the housing flange 35 can be integral to the threaded body 34 and, in other embodiments, the housing flange 35 can include a nut that is screwed onto the first end 36 of the threaded body 34.

The bolt housing 33 is positioned such that the threaded body 34 passes through the second opening 29 in the mounting bracket 20 and the opening 32 in the brake flange 3. For example, in embodiments, the bolt housing 33 can be pushed through the two openings 29 and 32, in a direction away from the first arm member 21 of the mounting bracket 20 (e.g., toward the outside of the vehicle) until its further movement is prohibited by the engagement of the housing flange 35 with an inside surface 39 of the second arm member 22 (see FIG. 1). The bolt housing 33 is held in place by a nut 40. Threads 41*a* on the inside of the nut 40 engage threads 41*b* on the threaded body 34 so that the nut 40 can be screwed onto the threaded body 34 so that an inside surface 42 of the nut 40 engages the outside surface 43 of the brake flange 3 such that an outside surface 44 of the nut 40 is oriented away from the brake flange 3. The engagement of the nut 40 with the brake flange pulls the housing flange 35 against the inside surface 39 of the second arm member 22, holding the mounting bracket 20 in place on the brake flange 3 and further holding the bolt housing 33 in place, disposed through the openings 29 and 32 on the second arm member 22 of the mounting bracket 20 and the brake flange 3, respectively.

With further reference to the drawings, and, in particular, FIG. 2, the sensor body 13 is moveably disposed within the bolt housing 33 such that the outside surface 19 of the sensor body 13 extends from a second end 45 of the bolt housing 33 toward the tone ring 6. It will be appreciated by individuals having skill in the relevant arts that the sensor body 13 is positioned within the bolt housing 33 such that a predetermined gap 46 (see FIG. 1) is achieved between the outside surface 19 of the sensor body 13 and the reference points 8 on the tone ring 6. Because the specific dimensions of various features employed in ABS braking systems can vary, any number of spacing shims 47 can be utilized to achieve the desired gap 46.

As depicted, for example, in FIG. 2, the spacing shims 47, which can be crafted of any suitable material known in the art, are configured such that they can be disposed around the sensor body 13. For example, in embodiments in which the sensor body 13 is cylindrical, the shims 47 are circular with an internal diameter slightly larger than the external diameter of the sensor body 13. When the sensor body 13 is placed into the bolt housing 33, an outside surface 48 of an outermost shim 47 engages the first, or inside, end 36 of the bolt housing 33 and an inside surface 49 of an innermost shim 47 engages an outside surface 50 of the collar 16. The desired gap 46 can be achieved by inserting an appropriate number of spacing shims 47, which can, according to various embodiments, be configured of varying thicknesses depending upon the details of the implementation. It should be understood that, in some embodiments, the length of the bolt housing 33, itself, might be appropriate for achieving a desired gap 46 in which case no spacing shims 47 may be needed. It should also be understood that, in some embodiments, the outermost shim 47 and the innermost shim 47 might be the same shim 47 (i.e., when only one spacing shim 47 is employed).

Figure 3:
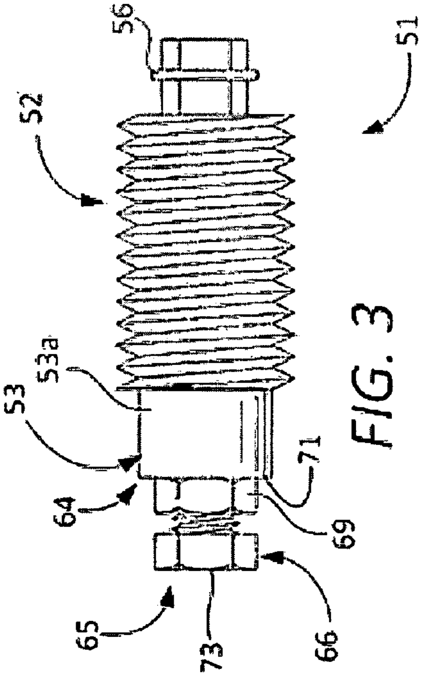
FIG. 3 is a side view of an illustrative plunger used in an ABS sensor apparatus in accordance with embodiments of the invention.
Figure 4:
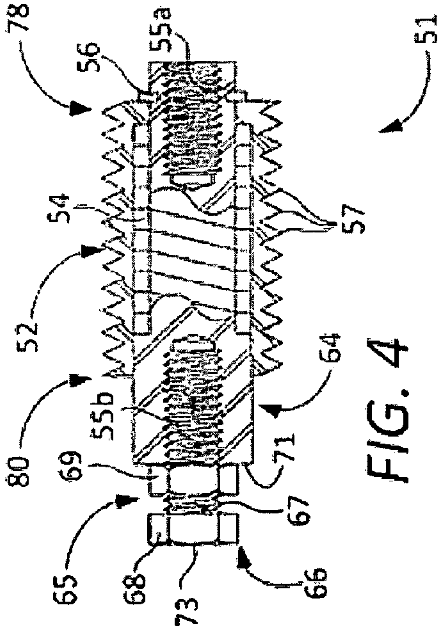
FIG. 4 is a partially cut-away side view of the illustrative plunger from FIG. 3 in accordance with embodiments of the invention.

With reference to FIGS. 2-4, the sensor apparatus 10 also is shown to include a spring-loaded plunger 51. As illustrated in FIGS. 3 and 4, the plunger 51 includes a threaded body 52, a plunger pin 53, a pin casting 54, a pair of springs **55*a* and 55*b*, and a retaining ring 56. The threaded body 52 is configured to be able to be inserted into the first opening 28, which is disposed in the first arm member 21 of the mounting bracket 20. The threaded body 52 includes threads 57 onto which a first nut 58 and a second nut 59 can be screwed. As shown, for example, in FIG. 2, the first nut 58 is screwed onto the threaded body 52 such that an outside surface 60 of the first nut 58 engages an inside surface 61 of the first arm member 21 of the mounting bracket 20. The second nut 59 is screwed onto the threaded body 52 such that an inside surface 62 of the second nut 59 engages the outside surface 63 of the first arm member 21. When tightened, the nuts 58 and 59 hold the plunger 51** in place.

With continued reference to FIGS. 3 and 4, the plunger pin 53 includes a plunger pin body **53*a* having a cavity 53*b* with threaded walls disposed therein. An adjustment assembly 65 is disposed at an outside end 64 of the plunger pin body 53*a*. As shown in FIGS. 3 and 4, the adjustment assembly 65 includes a moveable screw 66 having a threaded shaft 67 and a flanged head 68. The threads on the screw 66 engage threads on the inside of a nut 69 and threads on the inside of the plunger pin body 53*a*, such that the nut 69 engages an outside end 71 of the plunger pin body 53*a*. In some embodiments, the screw 66 is screwed directly into the plunger pin body 53*a*, without the inclusion of the nut 69. According to various embodiments of the invention, the screw 66 can be screwed in and out of the plunger pin body 53*a* such that an outside surface 73 of the screw 66 can be positioned as desired. The adjustment assembly 65 allows for fine-tuning the position of the plunger pin 53 with respect to the sensor head 15, as shown in FIG. 1**.

As is further illustrated in FIG. 1 and indicated above, the plunger 51 includes a plunger pin 53 that is partially disposed within the threaded body 52. In its normal position, the spring **55*a* is compressed and the spring 55*b* is extended, keeping the plunger pin 53 in a first position. In this first position, when the plunger 51 is coupled to the mounting bracket 20 in an implementation of the invention, the outside end 73 of the plunger pin 53 engages an inside surface 74 of the sensor head 15, holding the sensor assembly 11 in place. In various embodiments, the plunger 51 can be any type of suitable plunger that includes an internal elastic mechanism such as, for example, a spring that allows return of the sensor head 15** to the first position subsequent to displacement from the first position.

During installation of an illustrative sensor apparatus 10 in accordance with various embodiments of the invention, the mounting bracket 20 is placed against a brake flange 3 such that a second opening 29 in a second arm member 22 of the mounting bracket 20 is aligned with an opening 32 in the brake flange 3. In embodiments, a flanged bolt housing 33 is passed through the two openings, 29 and 32 until an inside surface 76 of the housing flange 35 engages the inside surface 39 of the second arm member 22 of the mounting bracket 20. The nut 40 is screwed onto the other end 45 of the bolt housing 33 until the inside surface 42 of the nut 40 engages the outside surface 43 of the brake flange 3, thereby securing the mounting bracket 20 to the brake flange 3. The sensor assembly 11 is mounted on the mounting bracket 20 by way of inserting the sensor body 13 through the inside, open end 36 of the bolt housing 33 and pushing the sensor body 13 through the bolt housing 33 such that the outside surface 19 of the sensor body 13 extends outwardly from the outside end 45 of the bolt housing 33.

In this manner, the sensor body 13 can be placed in proximity to the tone ring 6 such that the outside surface 19 of the sensor body 13 is disposed near the tone ring 6, there being a predetermined gap 46 between the outside surface 19 of the sensor body 13 and the reference point 8 on the tone ring 6. In embodiments, this gap 46 can be achieved by sliding one or more spacing shims 47 onto the sensor body 13 before inserting the sensor body 13 through the bolt housing 33. When pushed into place, the shims 47 engage a collar 16 on the sensor head 15 and the housing flange 35 on the inside end 36 of the bolt housing 33. The spacing shims 47 prevent the sensor body 13 from moving any farther through the bolt housing 33 toward the outside, thereby defining the gap 46 between the sensing surface 19 of the sensor body 13 and the reference point 8 on the tone ring 6.

According to various embodiments of the invention, and as shown in FIGS. 1 and 2, the plunger 51 is inserted through the first opening 28 defined in the first arm member 21 of the mounting bracket 20. In embodiments, the plunger 51 includes the threaded body 52 that is configured to engage the inside walls of the first opening 28. In other embodiments, the plunger 51 is configured such that the cross-sectional area of the plunger is slightly less than the cross-sectional area of the opening 28, thereby allowing the plunger 51 to be inserted into the opening 28. An outside surface 73 of the plunger pin 53 that extends from the plunger body 52 is moved toward an inside surface 74 of the sensor head 15 until the outside surface 73 of the plunger pin 53 (which, in embodiments, can be an outside surface 73 of the moveable screw 66 of the adjustment assembly 65) engages the inside surface 74 of the sensor head 15. The plunger 51 is fastened into this position, thereby holding the sensor body 13 in place.

Figure 5:
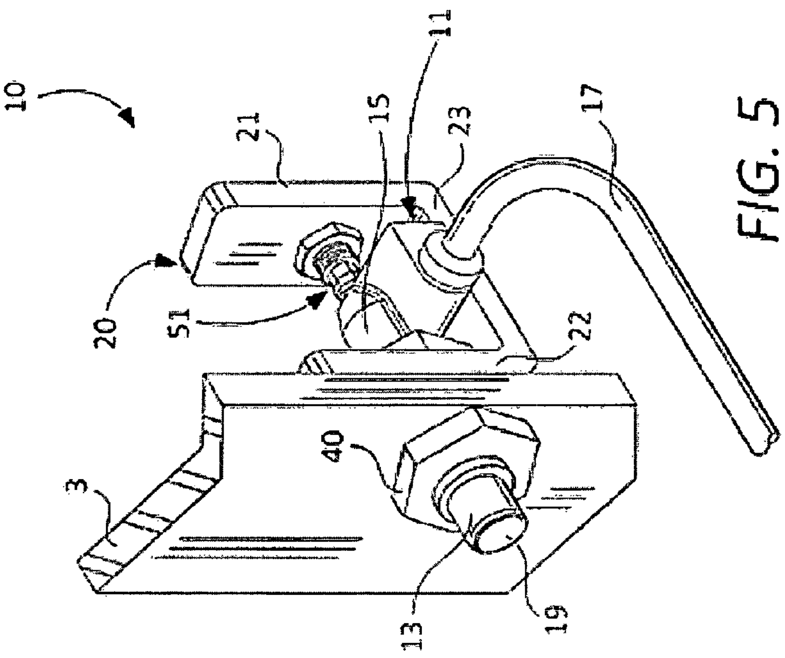
FIG. 5 is a perspective view of an assembled ABS sensor apparatus in accordance with embodiments of the invention.

In embodiments, as illustrated in FIGS. 1, 2, and 5, the plunger 51 is fastened into position by screwing the first nut 58 onto an inside end 78 of the threaded body 52 of the plunger 51 and the second nut 59 onto an outside end 80 of the plunger body 52. The nuts 58 and 59 are tightened such that an outside surface 60 of the first nut 58 engages an inside surface 61 of the first arm member 21 of the mounting bracket 20 and an inside surface 62 of the second nut 59 engages an outside surface 63 of the first arm member 21 of the mounting bracket 20, holding the plunger body 52 in place. This configuration (which is characterized, at least in part, by the existence of the gap 46 between the reference point 8 and the outside surface 19 of the sensor body 13) is referred to herein as the first position, as shown, for example, in FIG. 6A.

In operation, as will be appreciated by individuals having skill in the relevant arts, the sensor body 13 can be knocked out of the first position by any number of various events. For example, in the case of trailers/towable vehicles, a sharp turn can cause the wheel hub to tilt, as illustrated, for example, in FIG. 6B, such that the tone ring 6 (and/or the reference points 8 disposed thereon) makes contact with the outside surface 19 of the sensor body 13, thereby pushing the sensor body 13 out of the first position. Of course, any number of other events such as, for example, the introduction of road debris, an encounter with a curb or other obstacle, and the like, may cause the sensor 20 to move from the first position.

Figure 6B:
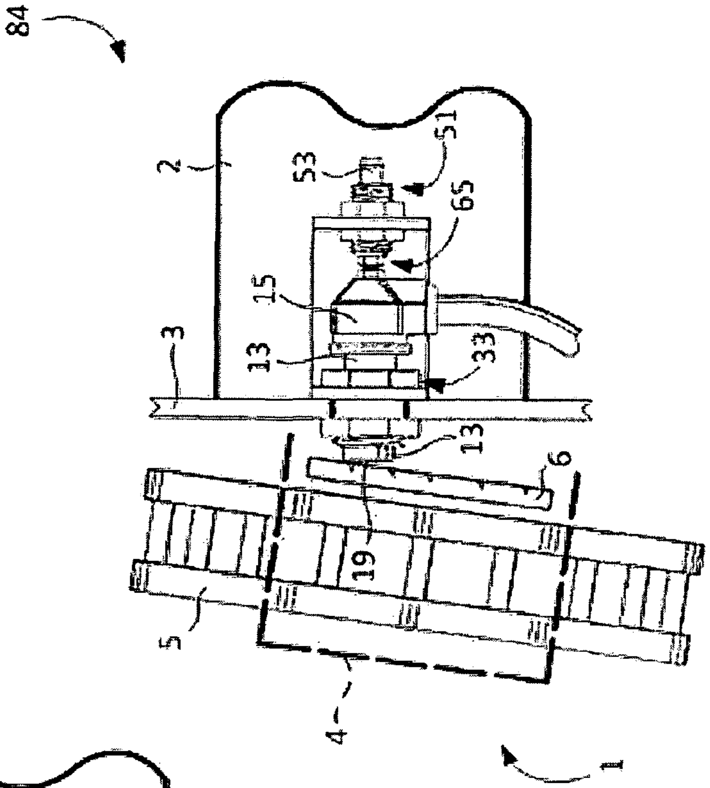
FIGS. 6A and 6B depict two illustrative positions in which components of an illustrative ABS braking system can be in accordance with embodiments of the invention.
Figure 6A:
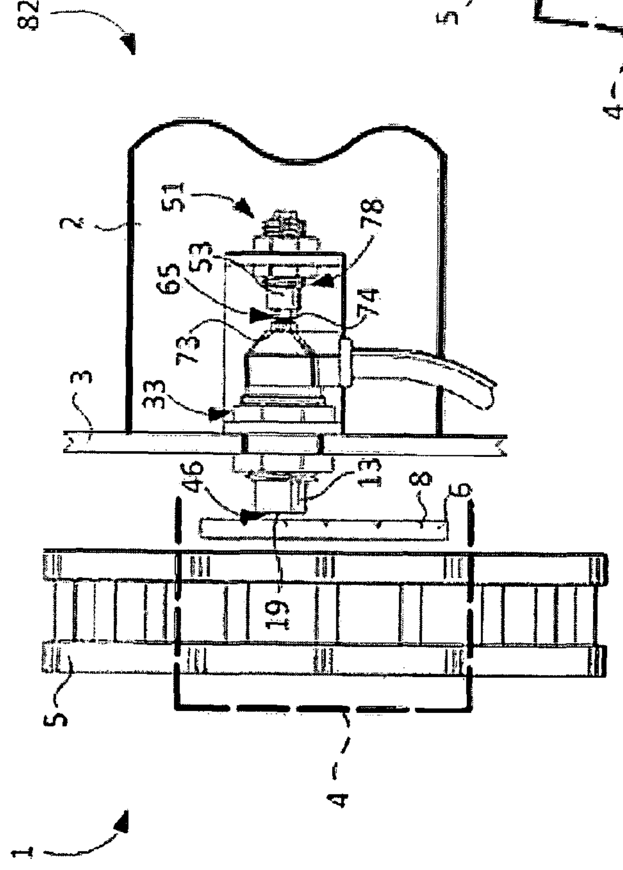

Turning now to FIGS. 6A and 6B, an illustrative sensor assembly is depicted in a first position 82 and a second position 84, respectively, in accordance with embodiments of the invention. The position to which the sensor body 13 is moved, regardless of where that is, is referred to herein as the second position 84. As illustrated in FIG. 6A, in the first position 82, a desired gap 46 is maintained between outside surface 19 of the sensor body 13 and a reference point 8 on the tone ring 6. Additionally, in the first position 82, the outside surface 73 of the plunger pin 53 engages the inside surface 74 of the sensor head 15, thereby holding the sensor assembly 11 in place. According to various embodiments of the invention, the spring 55*a* is in a compressed, normal, configuration in the first position 82 and the spring 55*b* is in an extended, normal, configuration in the first position 82. In other embodiments, the plunger 51 can be configured such that the normal position of the spring 55*a* is an extended configuration and the normal position of the spring 55*b* is a compressed configuration (whereby the spring 55*a* will be compressed, rather than stretched, in the second position 84 and the spring 55*b* will be extended, rather than compressed, in the second position 84).

In embodiments of the invention, in the second position 84 shown in FIG. 6B, the sensor head 15 pushes against the plunger pin 53, displacing the plunger pin 53 within the plunger body 52. This displacement extends the spring 55*a* beyond its normal, compressed, position and compresses the spring 55*b* beyond its normal, extended, position. The tension of the springs 55*a* and 55*b* urge the springs 55*a* and 55*b* back to their normal positions, thereby applying a thrusting force on the plunger pin 53. This outwardly thrusting force on the plunger pin 53 causes the application of an outwardly force on the sensor head 15, which attempts to push the sensor body 13 back into the first position 82. Because the sensor body 13 generally is configured such that normal operation depends upon the existence of the gap 46 (and, therefore, a particular position of the sensor body 13), embodiments of the invention allow for automatic recovery of the sensor body 13 position after events that push the sensor out of the first position 82.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. An antilock braking system that corresponds to a wheel, the system comprising:
- a braking assembly, wherein the braking assembly includes a brake flange mounted to an axle;
- a wheel hub rotatably coupled to an outside end of the axle;
- a tone ring having a reference point disposed thereon, wherein the tone ring is coupled to the wheel hub;
- a sensor that is moveably coupled to the brake flange, wherein the sensor senses the reference point to generate data about a speed associated with the corresponding wheel;
- a mounting bracket being generally U-shaped and comprising a first arm member extending away from a first end of a connecting member and a second arm member extending away from a second end of the connecting member, wherein the first and second arm members are substantially parallel to each other and substantially perpendicular to the connecting member; and
- a hollow bolt housing associated with said sensor that extends through an opening on the second arm member of the mounting bracket and an opening on the brake flange, wherein the hollow bolt housing is held in place with respect to the mounting bracket and the brake flange by an engagement means that engages an outside surface of the brake flange.

2. The system of claim 1, wherein the tone ring includes a plurality of reference points disposed thereon.

3. The system of claim 1, wherein the sensor is disposed within the opening of the hollow bolt housing such that an outside end of the sensor extends outwardly from the hollow bolt housing.

4. The system of claim 3, further comprising a plunger, having a spring-loaded plunger pin, that extends through an opening in the first arm member of the mounting bracket and is held in place such that, in a first position, an outside surface of the plunger pin engages an inside surface of the sensor head, thereby holding the sensor in place.

5. The system of claim 4, wherein in the first position, a desired gap is maintained between the outside surface of the sensor and the reference pint.

6. The system of claim 5, wherein in a second position, the plunger pin is displaced from a force applied thereto by the inside surface of the sensor head, and further wherein the tension in the spring causes the plunger pin to push the sensor back into the first position.

7. The system of claim 3, wherein the plunger pin includes a plunger pin body and an adjustment assembly, the adjustment assembly comprising a moveable screw that engages threads disposed within the plunger pin body.

8. The system of claim 7, wherein the adjustment assembly further includes a nut disposed between the moveable screw and the plunger pin body.

9. The system of claim 1 wherein said bolt housing is held in place by a nut that engages an outside surface of the brake flange.

10. An antilock braking system sensor apparatus, the apparatus comprising:
- a sensor assembly having a sensor body that extends outwardly from a sensor head;
- a generally U-shaped mounting bracket having a substantially parallel pair of arm members extending away from a connecting member, said mounting bracket is fixedly attached to a brake flange and includes a hollow bolt housing through which the sensor body extends, and said bolt housing extends through an opening on one of said arm members of the mounting bracket and an opening on the brake flange and is secured to said mounting bracket and said flange; and a plunger that is fixedly attached to the mounting bracket, wherein the plunger includes a spring-biased plunger pin that engages the sensor head to hold the sensor in a first position, wherein the spring-biased plunger is configured to cause the sensor to return to the first position in reaction to the sensor being moved into a second position, thereby displacing the plunger pin.

11. An antilock braking system, the system comprising:

a braking assembly, wherein the braking assembly includes a brake flange mounted to an axle;

a wheel hub rotatably coupled to an outside end of the axle;

a tone ring having a reference point disposed thereon, wherein the tone ring is coupled to the wheel hub such that the tone ring rotates with the wheel hub;

a sensor that is moveably coupled to the brake flange using a mounting bracket, wherein the sensor senses the reference point to generate data about a speed associated with the corresponding wheel;

a mounting bracket that is fixedly attached to a brake flange and includes a hollow bolt housing through which the sensor body extends, and said bolt housing extends through an opening on the mounting an opening on the brake flange and is secured to said mounting bracket and said flange; and a plunger that is fixedly attached to the mounting bracket, wherein the plunger includes a spring-biased plunger pin that engages the sensor head to hold the sensor in a first position, wherein the spring-biased plunger is configured to cause the sensor to return to the first position in reaction to the sensor being moved into a second position, thereby displacing the plunger pin.

* * * * *